No. 653,977. Patented July 17, 1900.
S. B. WATERS.
LAUNDRY RACK.
(Application filed Jan. 8, 1900.)
(No Model.)
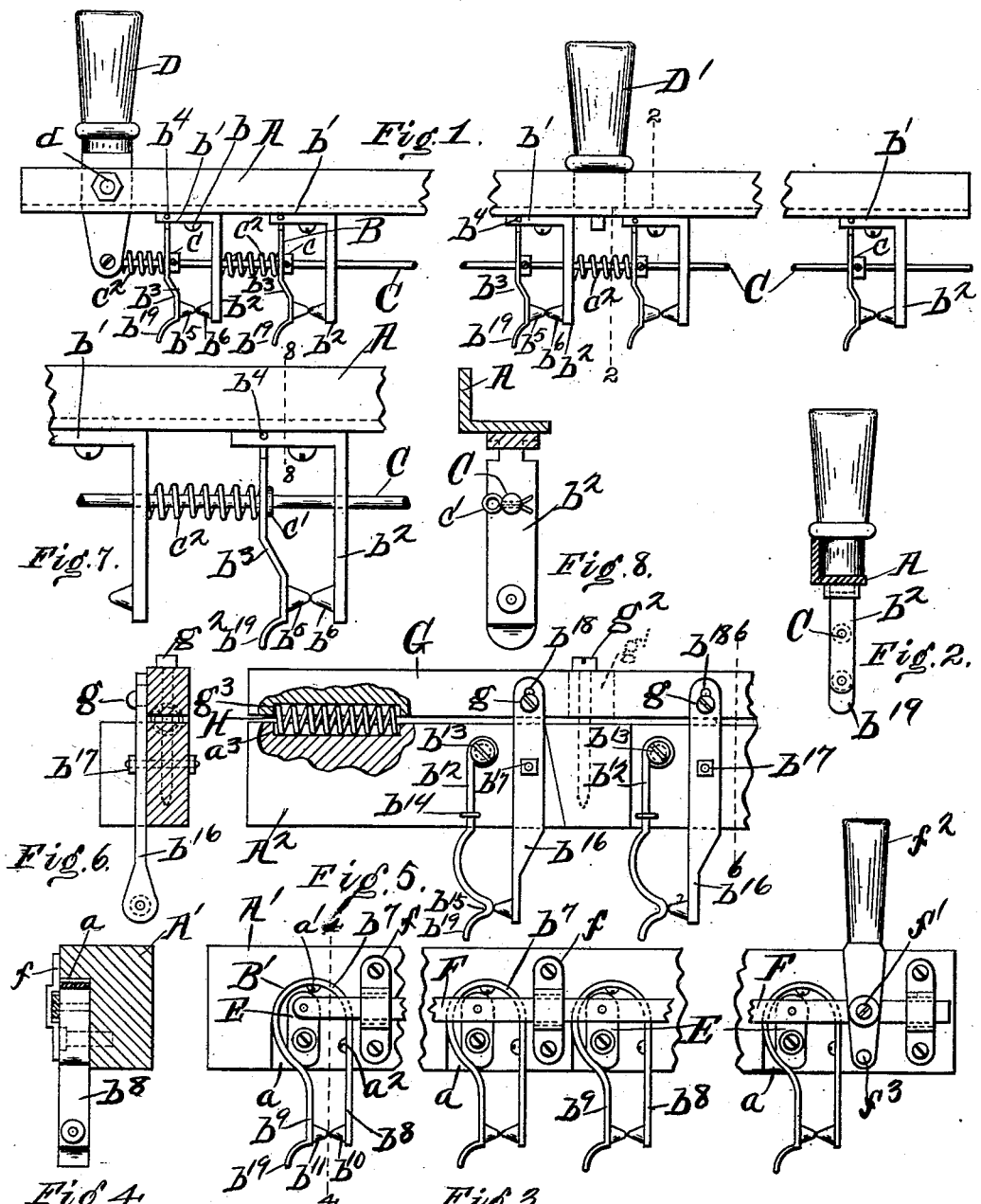
Witnesses
Walter F. Murray
Emma Lyford
Inventor
Silas B. Waters
By Geo. F. Murray
Attorney

UNITED STATES PATENT OFFICE.

SILAS B. WATERS, OF CINCINNATI, OHIO.

LAUNDRY-RACK.

SPECIFICATION forming part of Letters Patent No. 653,977, dated July 17, 1900.

Application filed January 8, 1900. Serial No. 705. (No model.)

*To all whom it may concern:*

Be it known that I, SILAS B. WATERS, a citizen of the United States, and a resident of Cincinnati, in the county of Hamilton and State of Ohio, have invented certain new and useful Improvements in Laundry-Racks, of which the following is a specification.

My invention relates to improvements in laundry-racks. Its object is a rack especially for use in drying collars and cuffs upon which there is no danger of tearing nor stretching the articles out of shape in attaching them nor in removing them, in which these operations are performed quickly and the latter simultaneously, and which holds the articles firmly and in a position such that they dry evenly. This object is attained by the means described in the annexed specification and illustrated in the accompanying drawings, in which—

Figure 1 is a view in side elevation of a rack embodying my invention, parts of it being shown broken out and the extremities being brought together to economize space. Fig. 2 is a transverse sectional view of the same, taken through irregular line 2 2, Fig. 1, looking toward the left. Fig. 3 is a view, similar to Fig. 1, of a modification. Fig. 4 is a transverse sectional view of the same, taken upon line 4 4 of Fig. 3 looking toward the left. Fig. 5 is a view in side elevation of another modification, part of the side being broken away to show the spring for holding the parts in their normal positions. Fig. 6 is a transverse sectional view taken upon line 6 6 of Fig. 5. Fig. 7 is a side elevation, upon an enlarged scale, of a modification differing but slightly from that shown in Fig. 1. Fig. 8 is a transverse sectional view of same, taken upon line 8 8 of Fig. 7.

Referring to Figs. 1, 2, 7, and 8, upon the under side of bar A is secured a series of gripping devices B, between the jaws of which the articles to be dried are grasped. These gripping devices consist of a series of angle-pieces, each secured to bar A by a screw $b$, passing through its horizontal arm $b'$, its other arm projecting down at substantially a right angle to the bar to form the rigid jaw $b^2$ of the gripping device and a movable jaw $b^3$, hinged at $b^4$ to the arm $b'$ of the angle-piece. Each jaw has an inwardly-projecting stud or tooth $b^5$ $b^6$, which contact with one another in the closed position of the jaws. Passing through the jaws of the gripping devices B is an actuating-rod C, upon which, in the form shown in Figs. 1 and 2, are secured collars $c$ between the jaws of each gripping device to abut against the movable jaw $b^3$. In the form shown in Figs. 7 and 8 a cotter-pin $c'$ is used to perform the same function as the collar $c$ in Figs. 1 and 2. The gripping devices are held closed by springs $c^2$, coiled around rod C between the jaw $b^2$ of one of the gripping devices and movable jaw $b^3$ of the gripping device adjacent to it. Rod C is swiveled to an actuating-lever D, which turns upon a fulcrum $d$ in bar A. Lever D also acts as a handle with handle D', by which the rack is conveyed to and from the drying-room when filled with articles.

In the form shown in Figs. 3 and 4 the bar A' has upon one side a series of recesses $a$, to the walls of which the gripping devices B' are secured by screws $a'$ and $a^2$. These devices consist of spring-metal strip $b^7$, bent back upon itself so that its ends come together to form the rigid and movable jaws $b^8$ and $b^9$, respectively, upon which are inwardly-projecting teeth $b^{10}$ and $b^{11}$, between which the articles to be dried are gripped. Within each recess $a$, between the jaws $b^8$ and $b^9$, is a cam E, centrally pivoted to the bar A', so that one end bears against the jaw $b^8$. The other end of the cam is pivoted to an actuating-rod F, which slides in brackets $f$ upon the side of the rod A'. This rod is swiveled at $f'$ to actuating-lever $f^2$, which itself is pivoted at $f^3$ to the side of bar A'.

In the forms shown in Fig. 1, 2, 7, and 8 and Figs. 3 and 4, respectively, the jaws of all of the gripping devices may be simultaneously opened by pressing actuating-lever D or $f'$ to the right. In those actuated by lever D collar $c$ or cotter-pin $c'$ presses movable jaw $b^3$ open. In those actuated by lever $f'$ cam E presses movable jaw $b^8$ open.

In the form shown in Figs. 5 and 6 one jaw of the gripping device is composed of a metal strip or wire $b^{12}$, secured to bar A² at its upper end by a screw $b^{13}$ passing down beneath a staple $b^{14}$ and bent inward to form tooth $b^{15}$. The other jaw is composed of a bar $b^{16}$, pivoted at $b^{17}$ to the bar A² and having at its upper end an elongated hole $b^{18}$ to receive a pin $g$, which passes into actuating rod or bar G, which has vertical slots $g'$, (one of which is shown in dotted lines, Fig. 5,) through which a bolt $g^2$ passes down into bar or rod $A^2$, so that rod G may slide upon bar $A^2$. Both rods have recesses $a^3$ and $g^3$ in their tops and bottoms, respectively, to form a chamber, in which is seated a coiled spring H. To open the jaws of gripping devices $B^2$ simultaneously, rod G is pushed to the left. When released, spring H returns the rods to their normal position, closing the jaws of the gripping devices.

In using my invention a collar, a cuff, or other article to be dried is inserted between the jaws of each gripping device by pressing back on thumb-piece $b^{19}$ to open the jaws. The article is held by pressure between the jaws. When filled, the rack is placed in the drying-room. After drying the rack containing the dried articles is held over a basket or receptacle, the actuating-rod pushed to the side, simultaneously opening all of the jaws, and the articles drop into the receptacle. It is thus seen that both in inserting the articles in and removing them from the rack no strain is put upon the texture, and especially in the case of collars and cuffs the buttonholes are not stretched or torn.

While I have shown my invention in the best form known to me for accomplishing its purpose, it is obvious that many mere mechanical changes might be made in the details thereof without departing from the spirit or scope thereof.

What I claim is—

1. In a drying-rack the combination of a bar, rigid jaws secured to the bar, an inwardly-projecting stud upon each of said jaws, movable stud-bearing jaws pivoted to the bar so that the stud upon each movable jaw contacts the stud upon the fixed jaw opposite, springs for holding the jaws together, a sliding rod and means for coupling the movable jaws to the sliding rod, whereby the jaws may all be opened simultaneously.

2. In a drying-rack the combination of a bar, angle-pieces one arm of each of which is secured to the bar and the other arm of which projects down to form the rigid jaw of a gripping device, movable jaws, studs upon the rigid and upon the movable jaws contacting with each other, springs to hold the movable jaws closed against the rigid jaws, an actuating-rod, and means for coupling the movable jaws to the rod, substantially as and for the purpose set forth.

SILAS B. WATERS.

Witnesses:
WALTER F. MURRAY,
EMMA LYFORD.